(12) United States Patent
Nishikawa et al.

(10) Patent No.: US 7,171,997 B2
(45) Date of Patent: Feb. 6, 2007

(54) PORTABLE ELECTRIC ROUTER HAVING RADIAL FAN

(75) Inventors: Tomomasa Nishikawa, Hitachinaka (JP); Akira Onose, Hitachinaka (JP); Shinki Ohtsu, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 123 days.

(21) Appl. No.: 10/845,077

(22) Filed: May 14, 2004

(65) Prior Publication Data
US 2004/0250890 A1 Dec. 16, 2004

(30) Foreign Application Priority Data
May 14, 2003 (JP) .......................... P2003-136553

(51) Int. Cl.
*B27C 5/10* (2006.01)

(52) U.S. Cl. ............................... 144/136.95; 144/134.1

(58) Field of Classification Search ........... 144/136.95, 144/154.5, 134.1; 409/182, 181, 135–137; 310/63, 74, 50
See application file for complete search history.

(56) References Cited

U.S. PATENT DOCUMENTS 4,360,751 A * 11/1982 Arnold et al. ............ 310/60 R
4,459,087 A * 7/1984 Barge ........................ 417/356
4,716,648 A * 1/1988 Nel .............................. 29/596
4,757,221 A * 7/1988 Kurihashi et al. ............ 310/62
4,836,155 A * 6/1989 Slagley et al. ........... 123/90.16
4,836,755 A 6/1989 Nitsche et al.
5,315,193 A * 5/1994 Kummer et al. .............. 310/50
5,375,637 A * 12/1994 Matsumoto et al. ... 144/136.95
5,632,578 A 5/1997 McCurry et al.
6,411,000 B1 * 6/2002 Rew ............................ 310/62

FOREIGN PATENT DOCUMENTS

GB 2 392 135 A 2/2004

* cited by examiner

*Primary Examiner*—Bena Miller
(74) *Attorney, Agent, or Firm*—Antonelli, Terry, Stout and Kraus, LLP.

(57) ABSTRACT

A compact and light-weight portable electric router produced at a low cost and capable of providing high cutting efficiency with low noise. A radial fan includes a cylindrical hub functioning as an attachment portion to a motor shaft, a plurality of fan blades having parts connecting to the hub, and a ring like guide section connected to the hub through the fan blades. An annular weight is connected to the guide section at a radially outer side of the guide section. The weight serves as a restriction section for restricting backflow of air from a discharge side to a motor side.

20 Claims, 5 Drawing Sheets

PORTABLE ELECTRIC ROUTER HAVING RADIAL FAN

BACKGROUND OF THE INVENTION

The present invention relates to a portable electric power tool such as an electric router, and more particularly, to the portable electric router capable of performing chamfering and groove forming operations by rotating a rotary cutting bit fixed to a motor shaft.

The portable electric router is a tool for performing chamfering or grooving work on a workpiece made of, for example, wood. This is an especially indispensable tool for producing furniture. FIG. 7 shows an example of a conventional portable electric router. The electric router includes a base 311, a housing 312, an electric motor (not shown), and a chuck 317. The base 311 serves as a guide when sliding on a work-piece W such as a wood. The housing 312 is movably supported on the base 311. The motor is housed in the housing 312 and has a motor shaft, whose lower end is provided with the chuck 317 for mounting a cutting bit 318 which may take on various forms. The bit 318 is rotated by rotation of the motor and can therefore perform beveling or chamfering work and groove forming work with respect to the workpiece W.

This type of tool must be highly efficient at cutting, must be lightweight, and easy to maneuver, and capable of producing good finished surfaces. Of these basic capabilities, if the finishing level is sufficient to make a product, normally cutting efficiency is most demanded for improving production. Generally, increasing the lamination volume of an electric motor is a general method to enhance the cutting efficiency. This leads to enlargement of the motor size and increase in its rotation power. However, enlarging the size of the motor increases the overall weight of the tool, so does the cost of production. Resultant electric router does not provide sufficient transportability and operability or workability, those being other requisite factors.

U.S. Pat. No. 5,375,637 discloses a router having an improved cooling fan. As shown in FIG. 8, a motor 313 includes a stator 314 having a stator coil and a stator core, and an armature 315 having an armature coil and an armature core. A cooling fan 320 is mounted to the lower portion of an armature shaft 316, i.e.; the motor shaft. The cutting bit 318 is mounted onto the lower end of the armature shaft 316 by the, chuck 317. The cooling fan 320 is an improved axial-flow fan for improving cutting efficiency. To this effect, a ring 323 is provided to which each radially outer peripheral edge of a fan blade of the axial flow fan 320 is connected. Thus, inertial moment of the entire rotating components including the armature 315, the armature shaft 316, the cooling axial flow fan 320, the chuck 317, and the cutting bit 318 can be increased without enlargement of the motor 313.

However, the axial-flow fan 320 provides less cooling efficiency and increases noise if the axial-flow fan is used to permit the air to pass through a narrow passage for cooling the motor 313. Particularly, loud noise is generated even at the operation under no load.

A radial fan generates noise lesser than that released from the axial-flow fan. However, a fan guide must be provided between a discharge side of a fan blade and a motor in order to guide the flow of the cooling air and to prevent the cooling air from being discharged toward the motor side. This increased in numbers of components, and lowers assembleability to increase a production cost.

SUMMARY OF THE INVENTION

It is an object of the present invention to overcome the above-described problems and to provide a portable electric router capable of restraining noise, improving cutting efficiency and being manufactured at low cost with high assemble-ability with a reduced numbers of components.

This and other objects of the present invention will be attained by providing a portable electric router including a housing, a motor, and an improved radial fan. The motor is supported in the housing and has a motor shaft. The radial fan is disposed in the housing and is attached to the motor shaft and is rotatable together with the motor shaft. The radial fan includes a hub, a plurality of fan blades, an annular guide section, and a weight. The hub functions as an attachment portion to the motor shaft. Each fan blade has a part connected to the hub. Each fan blade is connected to the annular guide section so that the annular guide section is connected to the hub through the fan blades. The weight is connected to the guide section and is positioned at a radially outer side of the guide section.

With this arrangement, inertial moment of the cooling fan, and ultimately the inertial moment of the motor shaft assembly is increased to enhance cutting efficiency with an identical motor. Further, loudness of the noise is not increased even cooling through a narrow passage because of the employment of the radial fan. Moreover, because the guide section and the weight serve as a fan guide, the numbers of components can be reduced, to lower production cost.

In another aspect of the invention, there is provided a portable electric router including the housing, the motor, a radial fan, and a preventing section. The radial fan is disposed in the housing and is attached to the motor shaft and is rotatable together with the motor shaft. The radial fan provides a motor side confronting the motor and a discharge side opposite to the motor side. The radial fan includes a hub, a plurality of fan blades, and an annular guide section. The hub functions as an attachment portion to the motor shaft. Each fan blade has a part connected to the hub. Each radially outer part of each fan blade is connected to the annular guide section, so that the annular guide section is connected to the hub through the fan blades. The preventing section is disposed between the annular guide section and the inner peripheral surface of the housing for restricting backflow of air from the discharge side to the motor side. Preferably, the preventing section is constituted by an annular weight connected to the guide section and positioned at a radially outer side of the guide section.

DETAILED DESCRIPTION OF THE PREFERRED EMBODIMENTS

Figure 1:
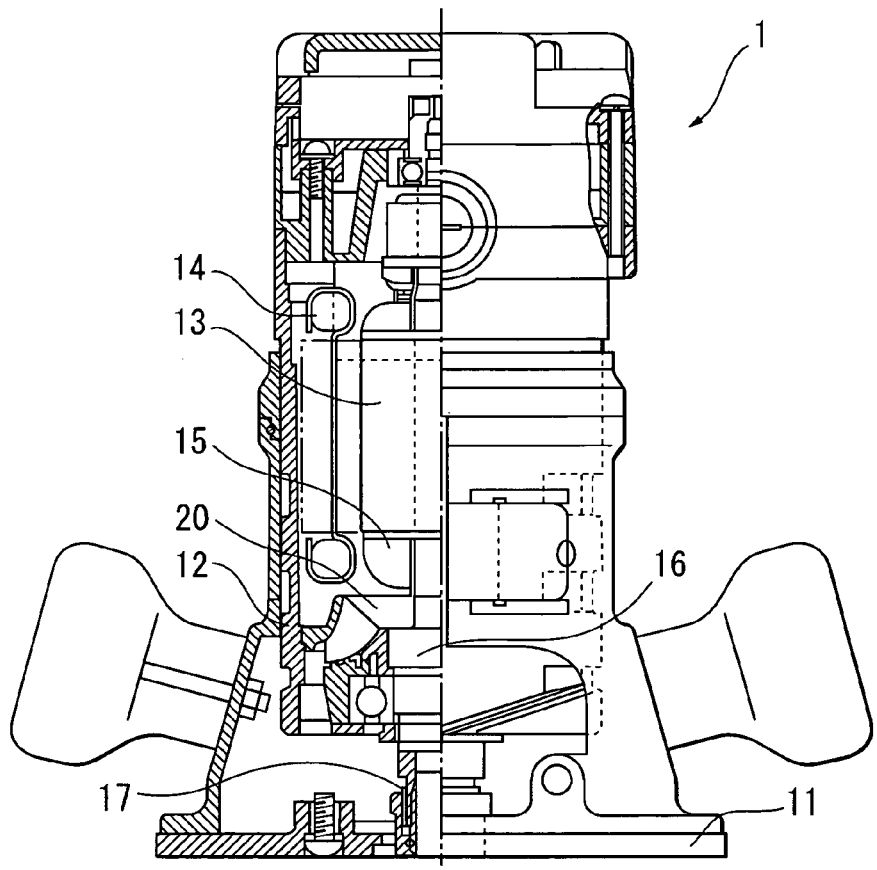
FIG. 1 is a partially cross-sectional front view showing a portable electric router according to one embodiment of the present invention.

A portable electric router according to a first embodiment of the present invention will be described with reference to FIGS. 1 through 3. As shown in FIG. 1, a portable electric router includes a base 11, a housing 12, an electric motor 13, and a chuck 17. The base 11 serves as a guide when sliding on a workpiece such as a wood. The housing 12 is in a cylindrical configuration and is movably supported through a support mechanism (not shown) on the base 11. The motor 13 is housed in the housing 12 and has a stator 14, an armature 15, and an armature shaft 16 serving as a motor shaft. The chuck 17 is attached to a lower end of the armature shaft 16 for holding a cutting bit 18 (FIG. 2).

Figure 2:
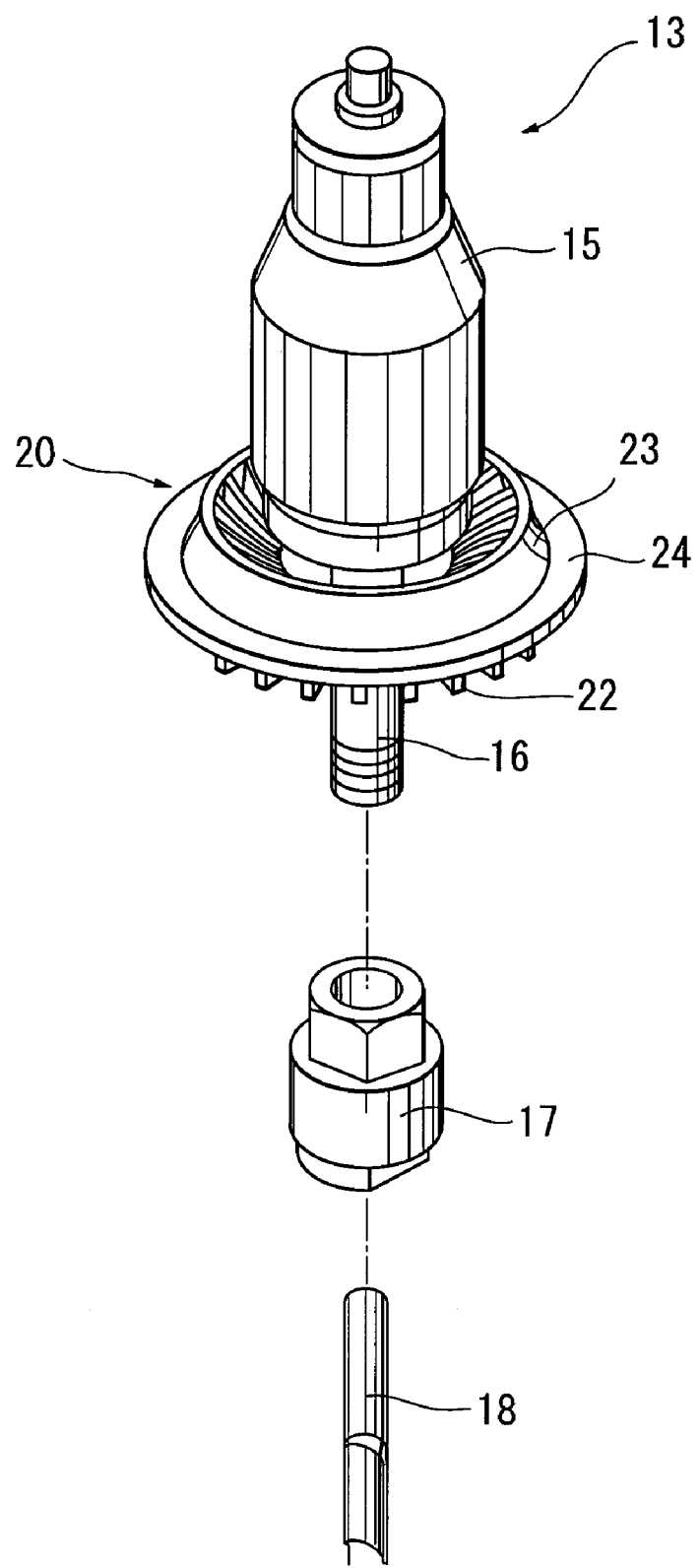
FIG. 2 is an exploded perspective view showing components of a motor constituting the portable electric router according to the embodiment.

FIG. 2 shows rotatable components of a motor 13 constituting the part of the portable electric router 1. The rotatable components include the armature 15 constructed from an armature coil, an armature core, a commutator, etc., the armature shaft 16, a cooling radial fan 20, and the chuck 17. The cooling radial fan 20 is attached to the armature shaft 16 whose lower end is formed with a thread with which the chuck 17 is threadingly engaged. The cutting bit 18 is assembled to the armature shaft 16 through the chuck 17. Upon rotation of the motor 13, the cutting bit 18 is rotated together with the armature shaft 16 for performing chamfering and groove forming operations.

Figure 3:
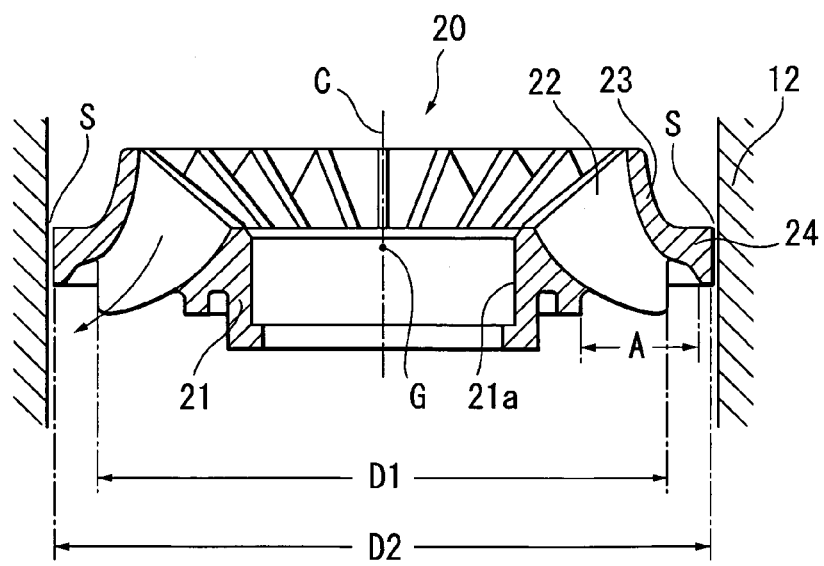
FIG. 3 is an enlarged cross-sectional view showing a radial fan and an inner wall of a housing according to the embodiment.

FIG. 3 shows the positional relationship between the radial fan 20 and an inner wall of the housing 12. The radial fan 20 includes a cylindrical hub 21 that is an attaching portion to the armature shaft 16, a plurality of fan blades 22 each having an inner end connected to the hub 21, and a ring like guide section 23 to which each outer end of the fan blade 22 is connected. The guide section 23 is connected to the hub 21 through the fan blades 22. A connecting position between the guide section 23 and the fan blade 22 is approximately in confrontation with or in opposition to a connecting position between the hub 21 and the fan blade 22. In other words, the guide section 23 is not directly connected to the hub 21. Each fan blade 22 substantially extends in a radial direction from a central axis C of the armature shaft 16, and extends radially outwardly from the hub 21.

As shown in FIGS. 2 and 3, the guide section 23 is integrally provided with an annular weight 24 positioned radially outwardly from the guide section 23. The weight 24 is at a radially outermost position from the central axis C of the armature shaft 16.

Figure 6:
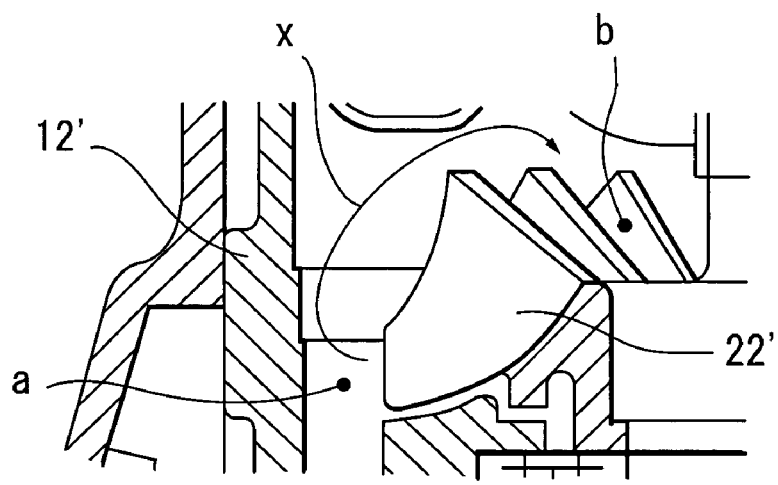
FIG. 6 is an enlarged cross-sectional view showing a radial fan and an inner wall of a housing in a portable electric router according to a related art.
Figure 7:
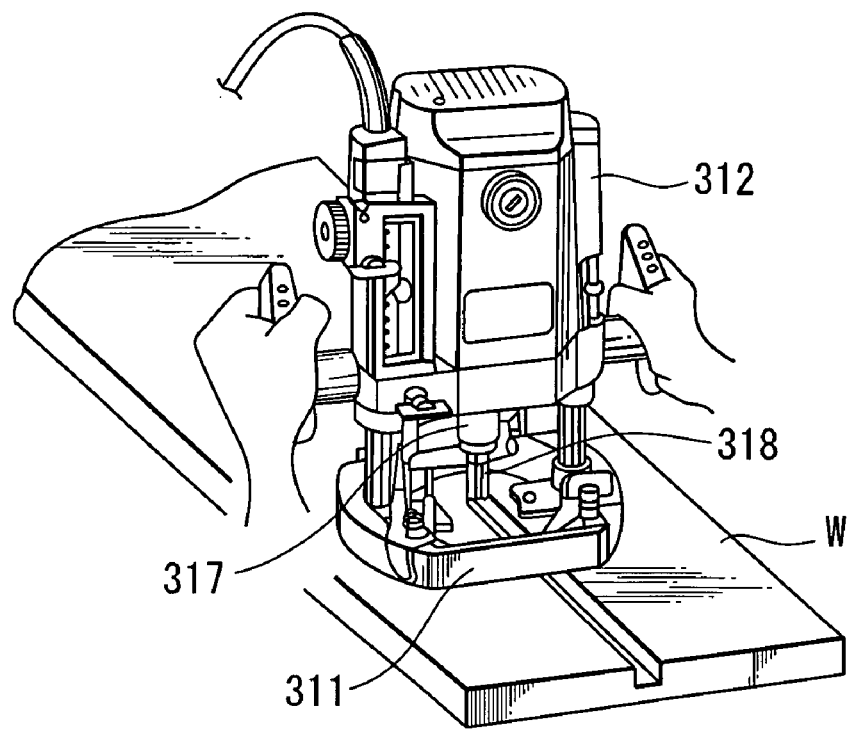
FIG. 7 is a perspective view showing a conventional portable electric router.
Figure 8:
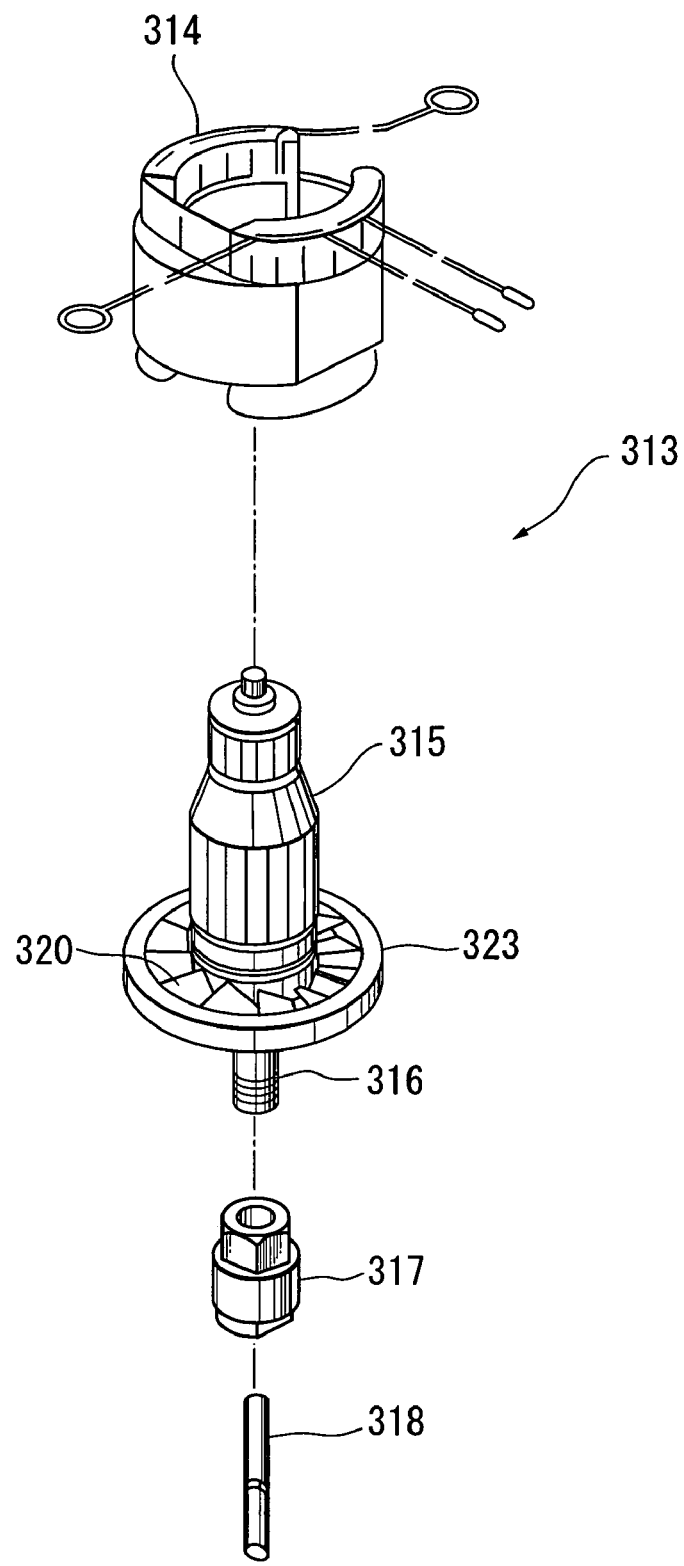
FIG. 8 is an exploded perspective view showing a motor and a fan those incorporated in the conventional router.

FIG. 6 shows a comparative example of a radial fan in which a component corresponding to the guide section 23 is not provided. In FIG. 6, reference numerals 22' designates fan blades and 12' designates a housing. In case of the radial fan without the guide section 23, high pressure region "a" and low pressure region "b" are generated due to the rotation of the fan, and a fan flow X may be generated at a range outside of the fan blade 22', which reduces an amount of effective air flow.

In order to restrain the fan flow flowing from the high pressure region "a" to the low pressure region "b", a fan guide is conventionally provided which shuts off the discharge side of the fan blades from the motor. In contrast, in the present embodiment, the ring like guide section 23 is provided in confrontation with the hub 21, and each part of the fan blade 22 is connected to the guide section 23, and further, the ring like weight 24 is connected to the guide section 23 at a radially outer side of the guide section 23. An outer peripheral dimension of the weight 24 is slightly smaller than an inner peripheral dimension of an inner wall of the housing 12, so that a minute gap S is defined between the radial fan 20 and the inner wall of the housing 12.

The radial fan 20 is attached to the armature shaft 16 by force-fitting. As shown in FIG. 3, an inner peripheral wall portion 21a of the hub 21 functions as the attachment portion to the armature shaft 16. A position of a center of gravity G of the entire radial fan 20 is within a range of the inner peripheral wall portion 21a in a direction of the central axis C of the armature shaft 16. With this arrangement, noise generation due to vibration of the fan caused by impact force generated during cutting operation can be restrained. That is, if the position of the center of the gravity G is outside the attachment portion 21a in the axial direction of the armature shaft 16, the fan 20 may be vibrated due to the impact force and noise may be generated by the vibration. In the fan according to the present embodiment, the noise can be effectively restrained. Furthermore, a position of a center of gravity of the weight 24 is also within the range of the inner peripheral wall portion 21a in the direction of the central axis C of the armature shaft 16, and therefore, vibration can further be effectively restrained.

An outer diameter D1 of the fan blades 22 is typically 60 mm, and an outer diameter D2 of the weight portion 24 is typically 71.5 mm. Further, the distance of the gap S is preferably not more than 2 mm in order to effectively prevent backflow passing through the gap S. The prevention of the backflow can increase amount of air flow to be suitably discharged in cooperation with the inner peripheral surface of the housing 12. Furthermore, the weight 24 does not decrease a cross-sectional area A of each outlet opening defined among neighboring fan blades 22, the outer peripheral surface of the hub 21, and the inner peripheral surface of the weight 24. Therefore, amount of air flow passing through the outlet opening can be increased and noise generation can be reduced.

In other words, the annular weight 24 functions as a preventing section positioned between the annular guide section 23 and the inner peripheral surface of the housing 12 for restricting backflow of air from the discharge side to the motor side. And in the embodiment, the preventing section 24 is provided integrally with the annular guide section 23.

Further, a combination of the guide section 23 and the weight 24 functions as a fan guide. The combination can restrain fan flow flowing from the high pressure region to the low pressure region, thereby providing effective amount of air flow. Further, inertial moment of the cooling fan, and thus, of the entire motor shaft assembly can be increased by the weight 24, thereby enhancing cutting efficiency.

The radial fan 20 is made from a material having high specific gravity such as aluminum, lead, and steel. Further, resin is also available. Accordingly, relatively heavy weight fan 20 can result in comparison with a fan made from a resin. Thus, large inertial moment can be set, to improve cutting efficiency, and further, mechanical strength can be improved to suitably set a weight of the weight 24.

Incidentally, the radial fan 20 is manufactured by molding using a metal mold. Therefore, the radially inner side of the guide section 24 is positioned radially outwardly from the radially outer side of the hub 21 in order to permit the molded product to be pulled out from the metal mold in the axial direction C of the armature shaft 16.

Figure 4:
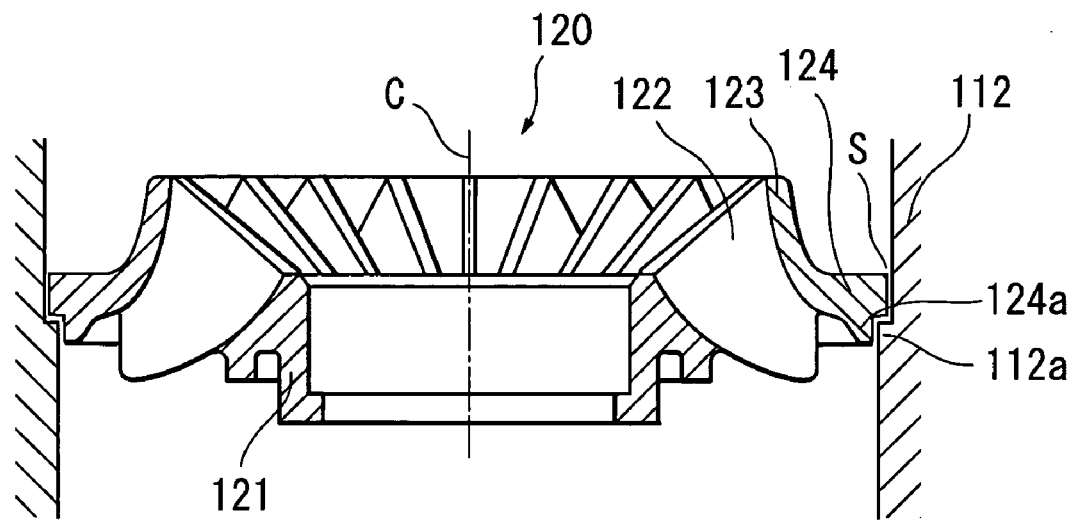
FIG. 4 is an enlarged cross-sectional view showing a radial fan and an inner wall of a housing in a portable electric router according to a second embodiment of the present invention.

FIG. 4 shows an essential portion of a portable electric router according to a second embodiment of the present invention wherein like parts and components are designated by the same reference numerals and characters as those shown in FIGS. 1 through 3. This embodiment pertains to the partial modification to the configuration of the radial fan 20 and the inner wall of the housing 12 of the first embodiment.

As shown in FIG. 4, a radial fan 120 includes a hub 121, a plurality of fan blades 122, a guide section 123, and an annular weight 124 provided around the annular guide section 123. An annular stepped portion 124a is integrally formed at an outer peripheral portion of the weight 124. Further, a complementary stepped portion 112a is formed at an inner wall of a housing 112 at position in direct confrontation with the stepped portion 124a in order to provide a minute step like clearance S between the radial fan 120 and the inner wall of the housing 112. Accordingly, flow resistance can be increased with respect to an air flow flowing from the discharge side of the fan, i.e., a lower portion in FIG. 4 to the inlet side i.e., an upper portion in FIG. 4 (motor side). Thus, discharging efficiency of the fan flow can be improved.

Figure 5:
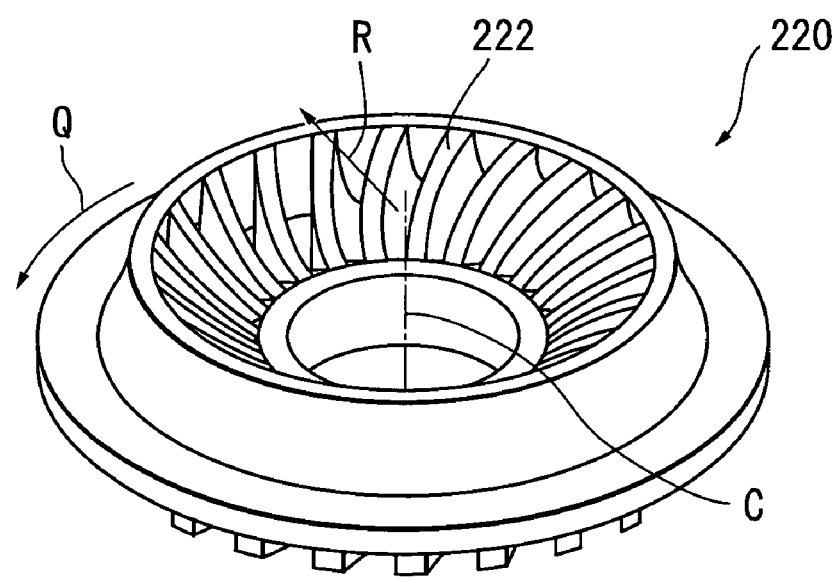
FIG. 5 is a perspective view showing a radial fan incorporated in a portable electric router according to a third embodiment of the present invention.

FIG. 5 shows a radial fan 220 constituting a portable electric router according to a third embodiment of the present invention. According to this embodiment, each fan blade 222 is bent toward a direction opposite to the rotating direction Q with respect to a radial direction R from the central axis C. With this arrangement, a velocity of air flow passing between the neighboring fan blades 222, 222 becomes lower than the rotating velocity of the fan blade 222, to further reduce noise.

While the invention has been described in detail with reference to specific embodiments thereof, it would be apparent to those skilled in the art that various changes and modifications may be made therein without departing from the spirit and scope of the invention.

What is claimed is:

1. A portable electric router comprising:
   a housing having an inner peripheral surface;
   a motor supported in the housing and having a motor shaft; and
   a radial fan disposed in the housing and attached to the motor shaft and rotatable together with the motor shaft, the radial fan comprising:
   a hub which is attached to the motor shaft;
   a plurality of fan blades, each of the fan blades having an inner part connected to the hub;
   an annular guide section to which an outer part of each fan blade is connected so that the annular guide section is only connected to the hub through the fan blades; and
   a weight connected to the guide section and positioned at a radially outer side of the guide section.

2. The portable electric router as claimed in claim 1, wherein the weight has an outer peripheral surface in direct confrontation with the inner peripheral surface of the housing and defining a minute space therebetween.

3. The portable electric router as claimed in claim 2, wherein the weight has a radial dimension slightly smaller than a radial dimension of the inner peripheral surface of the housing.

4. The portable electric router as claimed in claim 1, wherein the fan blades are arrayed radially outwardly from the hub with respect to a center of the motor shaft.

5. The portable electric router as claimed in claim 1, wherein the fan blades and the guide section define a connecting position in opposition to a connecting position between the fan blades and the hub.

6. The portable electric router as claimed in claim 1, wherein the hub has an attachment region to the motor shaft in an axial direction of the motor shaft, and wherein the radial fan provides its center of gravity positioned within the attachment region.

7. The portable electric router as claimed in claim 1, wherein the hub has an attachment region to the motor shaft in an axial direction of the motor shaft, and wherein the weight provides its center of gravity positioned within the attachment region.

8. The portable electric router as claimed in claim 1, wherein the weight has an outer peripheral surface with a stepped shape, and wherein the inner peripheral surface of the housing has a confronting part confronting the stepped shape, the confronting part having a complementary stepped shape to provide a step like space therebetween.

9. The portable electric router as claimed in claim 1, wherein the radial fan is made from a material having a high specific gravity.

10. The portable electric router as claimed in claim 9, wherein the radial fan is made from aluminum.

11. A portable electric router comprising:
    a housing having an inner peripheral surface;
    a motor supported in the housing and having a motor shaft;
    a radial fan disposed in the housing and attached to the motor shaft and rotatable together with the motor shaft, the radial fan providing a motor side confronting the motor and a discharge side opposite to the motor side, the radial fan comprising:
    a hub which is attached to the motor shaft;
    a plurality of fan blades, each of the fan blades having an inner part connected to the hub; and
    an annular guide section to which an outer part of each fan blade is connected so that the annular guide section is connected to the hub only through the fan blades; and
    a preventing section disposed between the annular guide section and the inner peripheral surface of the housing for restricting backflow of air from the discharge side to the motor side.

12. The portable electric router as claimed in claim 11, wherein the preventing section comprises an annular weight connected to the guide section and positioned at a radially outer side of the guide section.

13. The portable electric router as claimed in claim 12, wherein the weight has an outer peripheral surface in direct confrontation with the inner peripheral surface of the housing and defining a minute space therebetween.

14. The portable electric router as claimed in claim 13, wherein the weight has a radial dimension slightly smaller than a radial dimension of the inner peripheral surface of the housing.

15. The portable electric router as claimed in claim 12, wherein the fan blades are arrayed radially outwardly from the hub with respect to a center of the motor shaft.

16. The portable electric router as claimed in claim 12, wherein the fan blades and the guide section define a connecting position in opposition to a connecting position between the fan blades and the hub.

17. The portable electric router as claimed in claim 12, wherein the hub has an attachment region to the motor shaft in an axial direction of the motor shaft, and wherein the radial fan provides its center of gravity positioned within the attachment region.

18. The portable electric router as claimed in claim 12, wherein the hub has an attachment region to the motor shaft in an axial direction of the motor shaft, and wherein the weight provides its center of gravity positioned within the attachment region.

19. The portable electric router as claimed in claim 12, wherein the weight has an outer peripheral surface with a stepped shape, and wherein the inner peripheral surface of the housing has a confronting part confronting the stepped shape, the confronting part having a complementary stepped shape to provide a step like space therebetween.

20. The portable electric router as claimed in claim 12, wherein the radial fan and the weight is made from aluminum.

* * * * *